Nov. 5, 1940.    G. E. MILLER    2,220,611
BRAKE CONTROL
Filed July 13, 1938    3 Sheets-Sheet 1
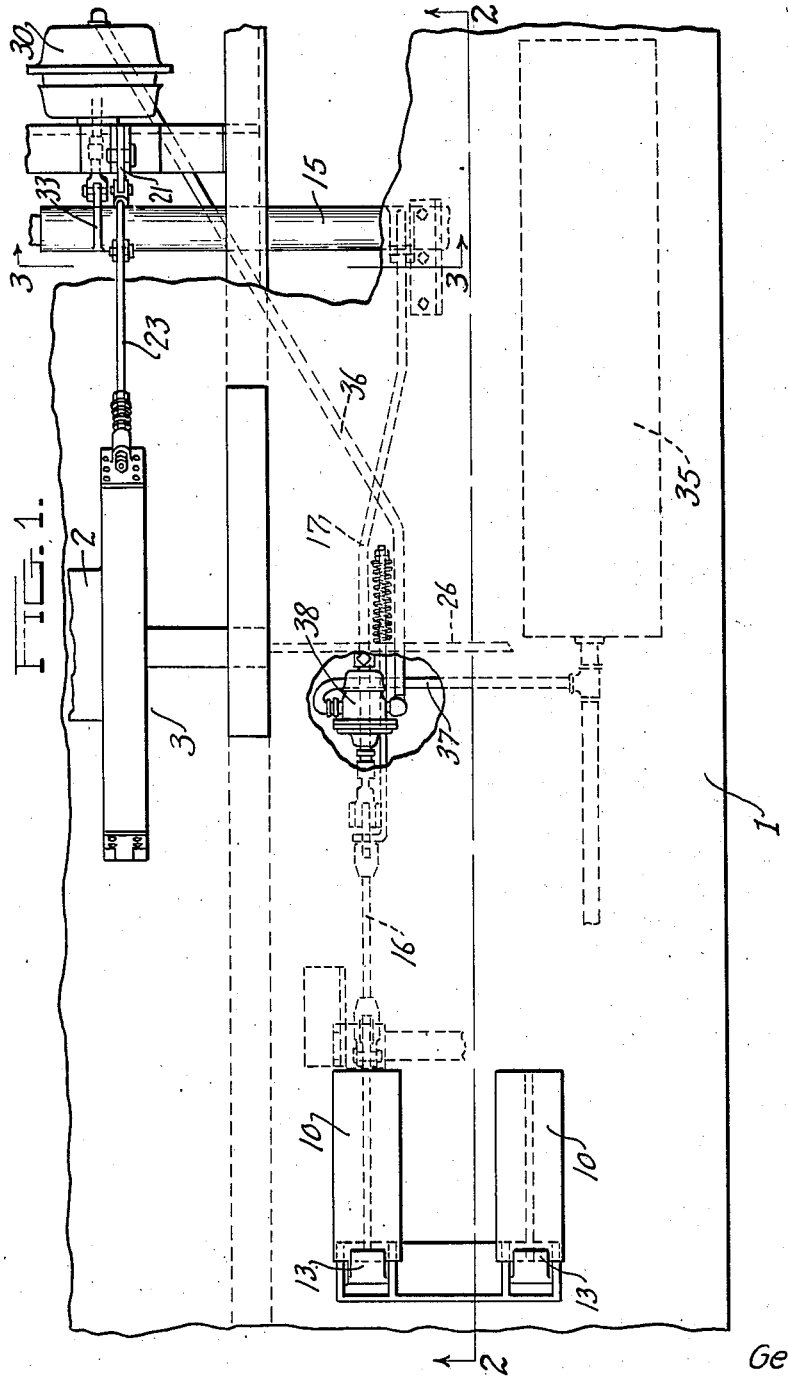
Inventor
George E. Miller Nov. 5, 1940. G. E. MILLER 2,220,611
BRAKE CONTROL
Filed July 13, 1938 3 Sheets-Sheet 2
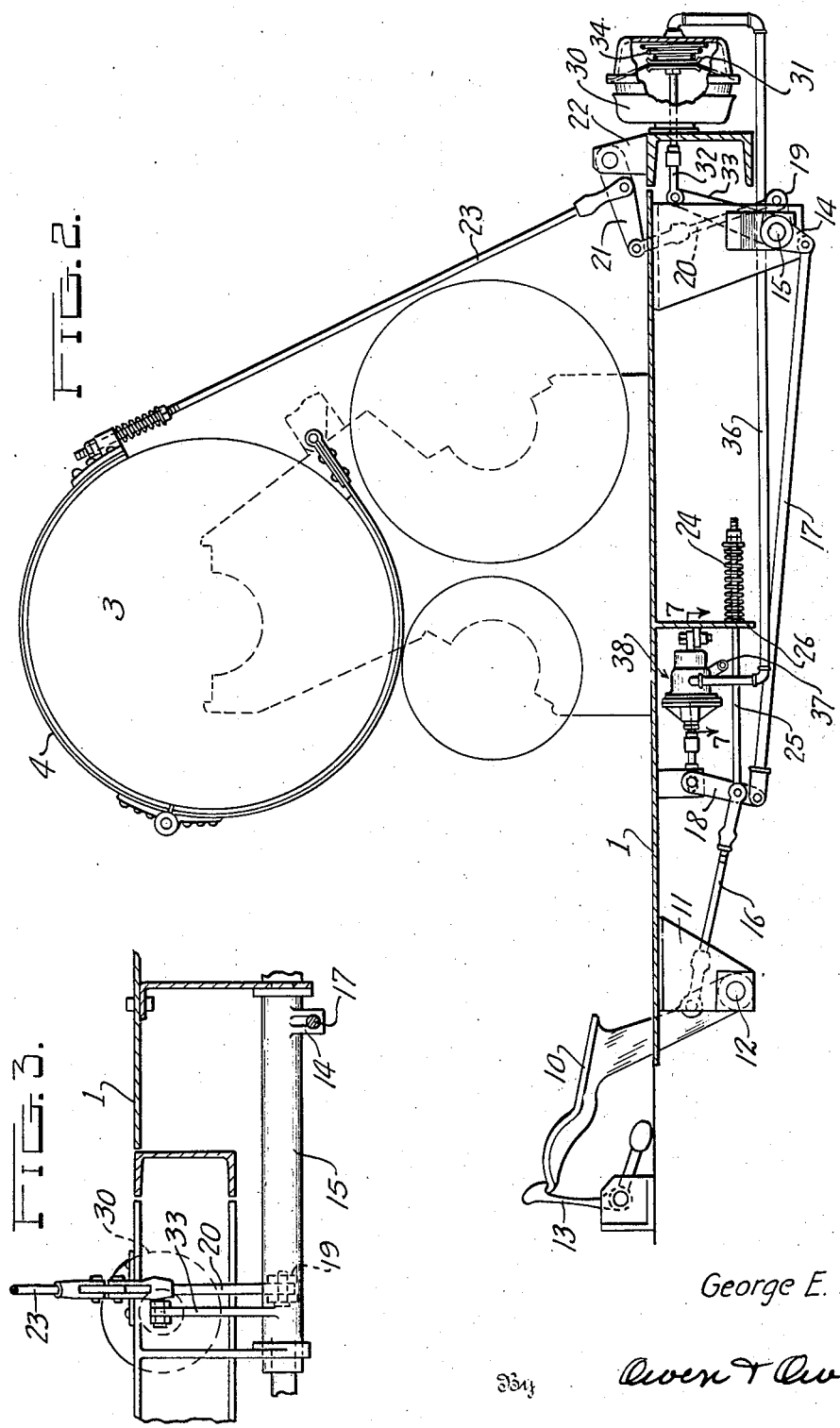
Inventor
George E. Miller

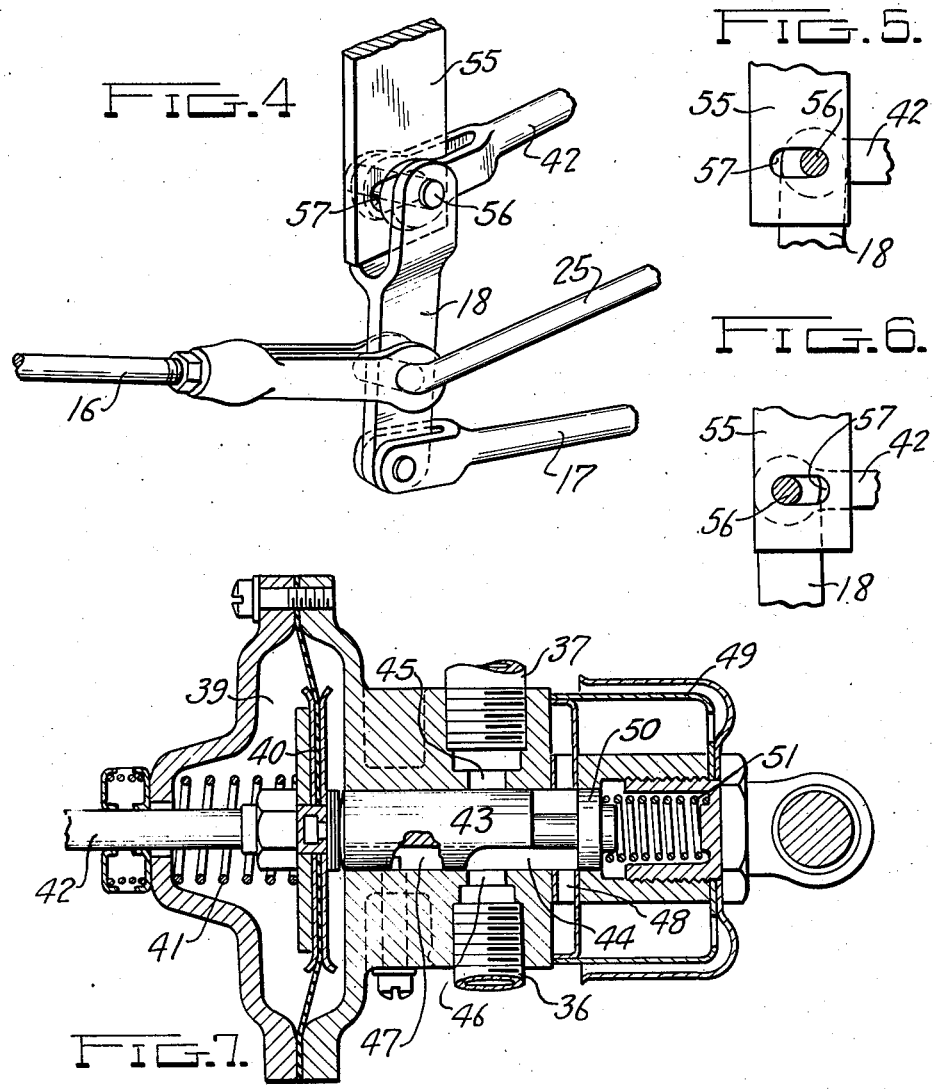

Patented Nov. 5, 1940

2,220,611

UNITED STATES PATENT OFFICE 2,220,611

BRAKE CONTROL

George E. Miller, Findlay, Ohio, assignor to The Buckeye Traction Ditcher Company, Findlay, Ohio, a corporation of Ohio Application July 13, 1938, Serial No. 219,055

3 Claims. (Cl. 188—151)

This invention relates to brake control means, and more particularly to means of this character used in connection with the hoisting drums of cranes, power shovels, or the like.

The primary object of the invention is the provision, in connection with manually operated applying or control means for hoist drum brakes or the like, of pneumatic means which is automatically operable upon an application of the brakes to assist the operator in the manual application, thus rendering such operation easier and less tiring for the operator and at the same time giving the operator better control of the brake application; also enabling a load to be slowly lowered, with precision, a fraction of an inch at a time. This latter feature in particular is important in certain classes of work, such for instance as steel erection or setting stone, and therefore broadens the range of usefulness of a machine in which used.

Further objects and advantages of the invention will be apparent from the following detailed description thereof, and from the accompanying drawings, in which—

Figure 1 is a plan view of an apparatus embodying the invention, with parts broken away; Fig. 2 is a section on the line 2—2 in Fig. 1, with the control parts in applied position and with the valve of the pneumatic booster means in closed position; Fig. 3 is a section on the line 3—3 in Fig. 1; Fig. 4 is an enlarged perspective detail of the connection between the mechanical brake applying means and the valve booster means, with the valve stem in closed position; Fig. 5 is a fragmentary detail of such connection showing the position of the valve stem pin in the bracket slot when the valve is in closed position; Fig. 6 is a similar detail showing the position of the valve stem pin in the bracket slot when the valve is in open position, and Fig. 7 is an enlarged sectional view of the control valve of the booster means taken on the line 7—7 in Fig. 2, with the valve in its normally closed position.

Referring to the drawings, 1 designates a platform, for instance of a crane or power shovel, and 2 a hoist drum in association therewith having a brake wheel or disk 3 fixed thereto and a brake band 4 on such wheel.

The control means for the brake in which the present invention resides includes, in the present instance, a foot pedal 10 extending up through the platform floor and pivoted beneath the floor to a bracket 11 at 12. This pedal may be held in applied position by a catch member 13. The pedal arm is link connected to an arm 14 on a rock shaft 15, such links, for the purpose of the present invention, comprising the two links 16 and 17 connected through a lever link 18, the purpose of which will be later described.

The shaft 15 has a second arm 19 projecting therefrom in a manner to cooperate with the arm 14 and shaft to form a bell crank lever. The arm 19 is connected by a link 20 to the outer end of a rocker arm 21 pivoted to a bracket 22 on the platform 1. To multiply the applied power, the arm 21 is connected intermediate its ends by a link 23 to the brake band 4, such connection, in the present instance, being at the fulcrum side of the link center. It is apparent that a pull on the link 23 applies the brake and that such pull is accomplished by a depression of the pedal. This control mechanism is normally held in brake releasing position by a coiled expansion spring 24, which is mounted on a rod 25 connected to the lever link 18, in the present instance, at the point of connection of the link 16 therewith. One end thrust of the spring 24 is against the rod 25 and its other end thrust is against a stationary part 26 of the platform. Nothing new in itself is claimed for this brake operating mechanism.

The novel feature of the invention resides in combining a pneumatically operated power boosting or augmenting means with the mechanical brake applying means to facilitate an application of the brake and to render it more efficient for use in precision work, such as the slow and gradual lowering of a load, than has heretofore been possible so far as I am aware.

In carrying out this feature of the invention, a cylinder 30 with a piston 31, in the present instance of the diaphragm type, therein is mounted adjacent to the rock shaft 15 and a stem 32 projects from the piston and is connected to an arm 33 on said shaft. A spring 34 is provided in the cylinder 30 and acts against the piston 31 at the vacuum side thereof to normally urge a movement of the piston in brake releasing direction. In the present instance, the cylinder 30 at the opposite side of the piston 31 to the stem 32 is connected to a vacuum source indicated by a tank 35 (Fig. 1), through pipes 36 and 37, which are connected through a control valve 38. This valve is of the reactionary type and requires approximately sixty-five pounds pressure to pull the valve to full open position. Any well-known reactionary valves of this type could be used.

The valve 38 (Fig. 7) has a chamber 39 in an end of its casing, in which is disposed a diaphragm type of piston 40 normally held at the inward position of its movement by a spring 41. A stem 42 projects from the piston 40 through the outer end of the chamber casing and connects to the upper end of the lever link 18 as hereinafter described, whereby a brake applying pull on such link will move the piston 40 to or toward open valve position.

A valve member 43 projects from the inner side of the piston 40, in opposition to the stem 42, into a passage 44 of the valve casing for reciprocatory movements therein when the piston 40 is moved. The passage 44 at one side has communication with the pipe 37 leading to the vacuum source 35 through a port 45, and at its opposite side has communication with the pipe 36 through a port 46. The port 45 is normally closed by the valve member 43, and is opened when such member has moved outward a predetermined extent. The port 46 is constantly open to the passage 44 and is also open to the chamber 39 at the inner or valve side of the piston 40 through a small channel 47 in the valve member. The passage 44 at the opposite end of the valve member to the chamber 39 has relief ports 48 in communication with the atmosphere through an air cleaner 49. When the valve has been moved to uncover the port 45, which has communication with the vacuum source, said relief ports are covered by a valve part 50 attached to the valve member 43 in rearwardly spaced relation thereto. A cushion spring 51 for the inward or closing movement of the valve acts against the rear valve end. It is apparent that when the port 45 is uncovered by the valve 43, the passage 44, pipe 36 and channel 47, which latter is open to the valve side of the chamber 39, are open to the vacuum source.

The piston stem 42, in the present instance, has its outer end forked and straddling a stationary guide bracket 55 (Fig. 4). A cross-pin 56 on said forked end projects through a slot 57 in said bracket and cooperates therewith to limit the permissible movements of the stem. The lever link 18 is disposed crosswise of the links 16 and 17 and has its upper end forked and straddling the forked end of the stem 42 and pivoted to the ends of the pin 56. The link 16 is connected to the lever link 18 intermediate the connections of the latter with the link 17 and stem 42, and preferably closer to the link 17 to obtain the proper action.

In the normal operation of the control, the operator in applying the brake depresses the foot pedal 10 slowly so as not to effect a sudden application, and by such action first causes a pull on the lever link 18 to effect an opening movement of the valve member 43 to the limit of the movement permitted by the pin 56 working in the slot 57. During such action of the lever link 18, it fulcrums about its connection with the link 17 and when the valve opening movement of the lever link has stopped, due to the pin 56 seating against the outer end wall of the slot 57, such link then fulcrums for a brief period on the pin 56 and acts to cause the pull on the link 16 to be applied to the link 17 to effect a mechanical application of the brake. The movement of the lever link 18 with the link 16, as above described, is against the tension of the spring 24 and also the tension of the spring 34 in the cylinder 30 providing such latter spring is present in the cylinder. It is also apparent that the opening movement of the valve member 43 by the link 18 is against the tension of the spring 41 in the control valve. When the valve member has thus been moved sufficiently to crack the port 45, the air relief valve 50 will have moved to close the relief ports 48 and the differential fluid pressure in the side 37 of the line will then enter the valve passage 44 and pipe 36 to the cylinder 30 and will also enter the valve side of the chamber 39 through the channel 47. This pressure first acts on the piston 31 in the cylinder 30 to impart a boosting action to the brake applying means and then acts on the diaphragm 40 in the control valve in conjunction with the spring 41 to move the valve member 43 to closed position. This boosting action and immediately following pneumatic closing of the valve takes place as the brake is being applied, and if the application is slow or is effected by successive short depressing movements of the foot pedal, one or more pneumatic boosting actions on the applying means will take place during each of such successive movements, depending on the length of duration of the movement. This action continues until the foot pedal has been lowered sufficiently to apply a predetermined pressure on the brake, at which time the pull on the lever link 18 will be sufficient to hold the valve member in open position against both the closing pressure of the spring 41 and the fluid pressure action on the diaphragm 40. In practice, the successive opening and closing actions of the control valve take place during approximately three-quarters of the applying movement of the brake, and after this the applying pressure is sufficient to cause the valve to remain open during the continuing application of the brake and until it has again been released to approximately the three-quarters point.

To summarize: To start action in the system, pull occurs on the rod 16 and opens the valve 38 slightly to the vacuum source. In this action all slack is taken up on rod 17—20 and 23. As the valve is cracked open, action starts in cylinder 30 which imposes a push action on rod 17 and allows lever 18 to pivot around the pin joining the rod 16 and lever 18. The valve then releases into a position which closes off the vacuum source, but plunger 43 does not release fully. There is a lap of about $\frac{5}{32}''$ between the openings of the air and vacuum. When the plunger is in this position neither air nor vacuum can act on line 36. Whatever vacuum action that has taken place up to this point will remain as the line 36 is sealed by this lap. By placing a gauge in the line 36 and by depressing pedal 10 slightly, the gauge will go up to about 16 inches of vacuum, then drop back to about 12 inches. If no further action takes place on lever 10 the gauge will stay at 12 inches indefinitely.

It is apparent from the above that during a mechanical application of the brake, and until approximately three-quarters of such application has been reached, the control valve will be automatically opened and closed to permit successive boosting or power augmenting actions to be applied to the brake, and also that the pressure on the foot pedal required to pull the valve open against its closing pressure, which in practice is preferably about sixty-five pounds, is proportionally less than such pressure due to the link and leverage connection between the foot pedal and valve stem. It only requires about ten pounds brake applying pressure on the pedal to start the valve to operate. It is also apparent that the control valve has a tendency to shut itself off and that unless a pressure is applied on the brake applying means sufficient to cause the valve to open, the application of the brake is entirely mechanical.

If, in the use of the control, the operator has a full brake application and wants to release the brake pressure just enough to allow the drum to start slipping very slowly, this is accomplished by reducing the foot pressure on the pedal until this slipping is observed. The valve responds precisely to the foot pressure. It is found in the use of this control that a heavy load which is sustained by the brake may be lowered with ease and precision a fraction of an inch at a time, thus making the device particularly applicable and valuable for use in connection with hoists when used in connection with steel erection work, the setting of stone, etc. For instance, it is found that a 6000 pound weight can be lowered with smoothness and precision one-eighth of an inch at a time on a single line.

The control has another advantage in that when the brake is fully applied and the pedal is locked down, the brake is held both by mechanical and pneumatic means, so that if either fails from any cause, the application of the brake will be continued by the other.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. The combination with a hoisting drum or the like and a brake therefor, of a manually controlled brake applying member, a differential fluid pressure line, a normally closed reactionary valve in said line having a valve stem, a lever connected at one end to the valve stem, means limiting the valve actuating movements of said end of the lever and serving as a fulcrum therefor during a portion of its action, brake control means connected to said brake and having a rod pivotally connected to the end of said lever opposite said valve, a connection between said brake applying member and said lever at a point on the lever intermediate its said end connections, means acting on the lever intermediate its ends to resist a member actuating movement thereof, an applying movement of said member causing said lever to fulcrum on its connection with said brake control means and move the valve stem to the outward limit of its opening movement, and the continued applying movement of the member causing applying movements of the brake control means, and pneumatically operated means interposed in said line and connected to said brake control means to impart a boosting action thereto when the valve is opened.

2. The combination with a hoisting drum or the like and a brake therefor, of a differential fluid pressure line, a normally closed reactionary valve in said line having a valve stem, a rocker means having operating connection with said brake, pneumatically operable means interposed in said line and connected to said brake rocker means to impart boosting action thereto when the valve is opened, a manually controlled brake applying member, a lever having pivotal connection at one end with said valve stem, a rod connecting the opposite end of said lever and said rocker means to impart rocking movements from one to the other, a connection between said member and lever intermediate its said end connections, means acting on said lever intermediate its said end connections for urging movements of the lever to close the valve, and means permitting limited movements of the valve connecting end of the lever to control the opening and closing movements of the valve, the applying movement of said member causing said lever to fulcrum on its connection with said second rod and move the valve stem to the outward limit of its opening movement, and a continued applying movement of the member causing applying movements of the brake control means through said second rod.

3. The combination as set forth in claim 2, wherein the valve limiting means comprises a stationary member having a slot therein, and a pin connecting the valve stem and lever, said pin being movable in said slot and having its valve controlling movements limited by the end walls defining a portion of the slot.

GEORGE E. MILLER.